United States Patent

Tomozawa

[15] 3,699,261

[45] Oct. 17, 1972

[54] FRAME SYNCHRONIZING CIRCUIT FOR HIGH CLOCK FREQUENCY DIGITAL COMMUNICATION

[72] Inventor: Atsushi Tomozawa, Tokyo, Japan

[73] Assignee: Nippon Electric Company, Limited, Tokyo, Japan

[22] Filed: Nov. 18, 1970

[21] Appl. No.: 90,705

[30] Foreign Application Priority Data

Nov. 27, 1969 Japan ......................44/95505

[52] U.S. Cl...........................179/15 BS, 178/69.5 R
[51] Int. Cl...............................H04j 3/06, H04l 7/08
[58] Field of Search...................179/15 BS; 178/69.5

[56] References Cited

UNITED STATES PATENTS 3,581,010 5/1971 Kobayashi.............179/15 BS
3,576,396 4/1971 Sloate........................325/325
3,496,536 2/1970 Wheeler et al. ...........325/323

*Primary Examiner*—Donald J. Yusko
*Attorney*—Sandoe, Hopgood & Calimafde

[57] ABSTRACT

A frame synchronizing circuit utilizes dual signal loops for inhibiting a clock pulse generator for a given time duration. The first loop includes a timing pulse generator a frame synchronous pulse detector, the set input of a bistable device an output thereof and two inhibit logic gates. The second loop control includes a synchronous pattern detector, delay means, and the reset input to the bistable device. Such dual control loop is useful in digital communication system operating at a high clock frequency in which loop delay time is not negligible.

6 Claims, 4 Drawing Figures

INVENTOR
ATSUSHI TOMOZANA by Sandoe, Hopgood & Calimafde
ATTORNEYS

INVENTOR
ATSUSHI TOMOZANA by
Sandoe, Hopgood & Calimafde
ATTORNEYS

FRAME SYNCHRONIZING CIRCUIT FOR HIGH CLOCK FREQUENCY DIGITAL COMMUNICATION

This invention relates generally to synchronizing circuits and more particularly to a frame synchronizing circuit for a digital communication system such as a PCM communication system which is efficiently operable at high clock frequencies.

In a digital communication system, and especially in a PCM communication system, the digital signal to be transmitted is multiplexed during each word or frame. Therefore, means for synchronizing the frames is necessary so that the transmitted word sequence may be correctly identified at the receiving terminal. Usually a predetermined particular pattern, which the digital information signal would not assume, is inserted into the PCM signal at the transmitter terminal at a specific position in each frame. At the receiving terminal, the specific pattern is detected to bring the timing circuit into synchronism such that frame synchronization is achieved.

Two types of synchronizing patterns are known, one using one bit in each frame, and the other using a chain of a plurality of bits in each frame. The latter is featured by its quick recovery time synchronization.

An example of a frame synchronizing circuit is described in U.S. Pat. No. 3,065,302. In the circuit therein disclosed a discoincidence pulse is produced at the receiving terminal when coincidence fails between the synchronizing pattern detection pulse produced when the synchronizing pattern included in the received pulse train has been detected, and the synchronizing pulse generated by using the timing pulses supplied by the timing circuit. The clock pulses to be applied to the timing circuit are inhibited by the presence of the discoincidence pulse.

This frame synchronizing circuit is not correctly operated unless the loop delay time from the application of the clock pulse and the production of the discoincidence pulse is less than one clock interval. Practically, however, it is often the case that the delay time of the loop increases relatively with an increase in the clock frequency of the digital communication system. For this reason the conventional synchronizing circuit is not always suitable for use in digital communication, particularly in digital communication systems operating at high clock frequencies.

It is therefore an object of the invention to provide a frame synchronizing circuit for use in a digital communication system in which the problems arising from the delay time are significantly reduced if not totally eliminated.

In the prior art frame synchronizing circuits, one common path is used to start and stop the inhibition of the clock pulses. In contrast, according to this invention, this path is divided into two distinct paths. Furthermore, the time difference between the synchronizing pattern detection pulse and the synchronizing pulse generated at the receiving terminal is measured directly to shift the production of the next timing pulse by an amount corresponding to this time difference. By applying this principle, it becomes possible with the circuit of the invention, to deal with the loop delay time as a factor of secondary importance. Thus, the circuit of the invention makes it possible to provide a frame synchronizing circuit having a quick synchronization recovery which is applicable to a digital communication system operating at a high clock frequency in which delay time of the circuit is not negligible. The circuit of the invention is particularly useful for operation where use is made of a concentrated synchronizing pattern including a plurality of bits.

To the accomplishment of the above and to such further objects as may hereinafter appear, the present invention relates to a frame synchronizing circuit for high clock frequency digital communication substantially as defined in the appended claims, and as described in the following specification taken together with the accompanying drawing in which:

Figure 1:
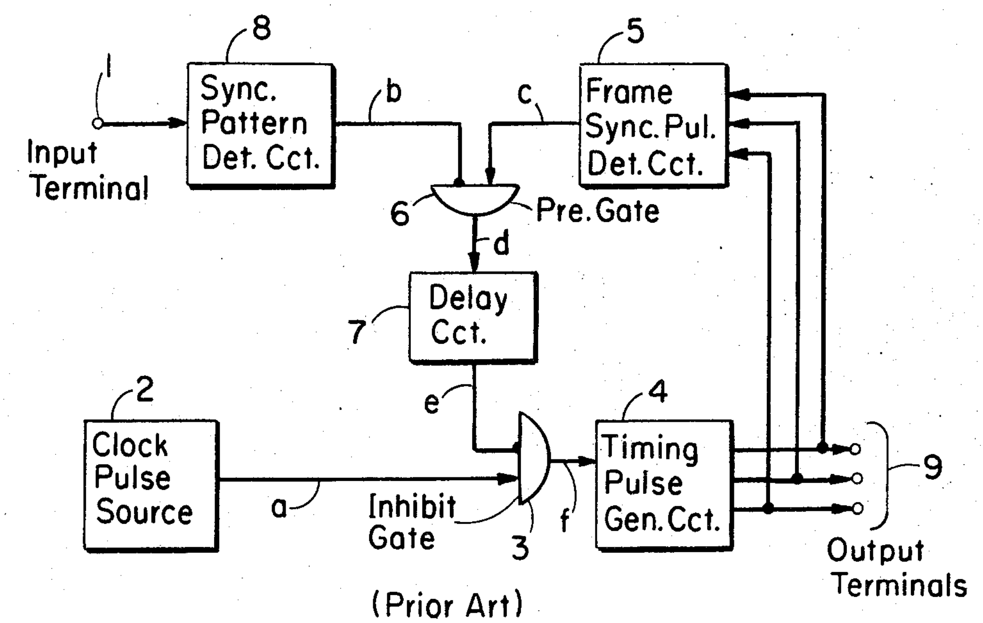
(Prior Art) FIG. 1
FIG. 1 is a schematic block diagram showing a conventional frame synchronizing circuit.

To distinguish the features of the frame synchronizing circuit of this invention, a conventional frame synchronizing circuit will be first described in connection with its limited frame synchronizing function. That circuit is shown in FIG. 1 in the form of a conventional frame synchronizing circuit for use with a concentrated frame synchronizing pattern of a plurality of bits. In that circuit, a received pulse train is applied to an input terminal 1 and thence to a synchronizing pattern detection circuit 8 which comprises, for example, a shift register and an AND circuit, so that a detection pulse *b* (FIG. 2) of an appreciable amplitude is generated at the output terminal only when the circuit receives pulses having a predetermined synchronizing pattern. The clock pulses a (occurring at times $T_1$, $T_2$, $T_3$, . . .) generated by a clock pulse source 2 are applied to a timing pulse generating circuit 4 via an inhibit gate 3 which is normally in the open state. Timing pulse generating circuit 4 is composed of a plurality of counters and so associated elements and is advanced in response to the output *f* of an inhibit gate 3 to generate various timing pulse trains at output terminals 9 having the same period as that of the frame. Circuit 4 may be, for example, the counter described in Chapter 18 of "-Pulse, Digital and Switching Waveforms" by Jacob Millman and Herbert Taub, published by McGraw-Hill Book Company, 1965.

A frame synchronizing pulse generating circuit 5 receives the timing pulse trains from timing pulse generating circuit 4, and in response thereto generates only one tentative synchronizing pulse c in each frame period. Circuit 5 may be, for example, constituted of AND gates as described in Chapter 9 of the Millman and Taub reference cited above. Generally, the time position of the tentative synchronizing pulse *c* is determined according to the initial condition of the receiving terminal circuit. This time position is not always coincident with the time position of the synchronizing pattern of the received pulse train. For this reason, synchronization is needed to bring the two time positions into coincidence.

In the prior art circuit shown in FIG. 1, this synchronizing operation is performed by a loop comprising inhibit gate 3, timing pulse generating circuit 4, and frame synchronizing pulse generating circuit 5. The loop further comprises a preliminary gate 6 for inhibiting the tentative synchronizing pulse *c* when the detection pulse *b* is produced. The loop still further comprises a delay circuit 7 for delaying the output *d* of preliminary gate 6. Inhibit gate 3 inhibits the clock pulse each time the delayed tentative synchronizing pulse *e* appears at the output of delay circuit 7.

Figure 2:
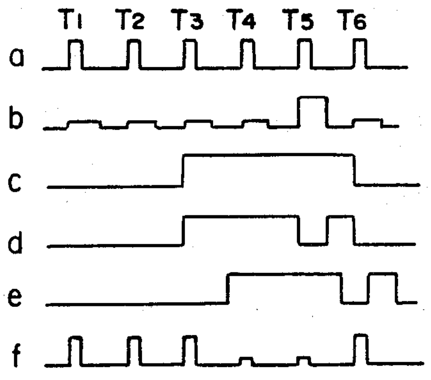
FIG. 2 is a waveform diagram illustrating the operation of the circuit shown in FIG. 1.

As illustrated in FIG. 2, the correct position of the synchronizing pulse of the receiving pulse train exists at the time $T_5$, and the tentative synchronizing pulse *c* is generated at the time $T_3$. At the time $T_3$ of the clock pulse, no detection pulse *b* is generated from synchronizing pattern detection circuit 8. As a result, the tentative synchronizing pulse *c* passes through preliminary gate 6 (waveform *d*) to reach inhibit gate 3 (waveform *e*) via delay circuit 7, and inhibits the next clock pulse occurring at time $T_4$. Under this condition, timing pulse generating circuit 4 and frame synchronizing pulse generating circuit 5 stop their operation only during one clock interval so that the synchronizing pulse remains in the "1" state. Since no detection pulse *b* is generated at the time $T_4$, the next clock pulse at the time $T_5$ is inhibited. A detection pulse *b* generated at the time $T_5$, inhibits preliminary gate 6. As a result, the inhibit state of gate 3 is released at the time $T_6$. The clock pulse at the time $T_6$ reaches timing pulse generating circuit 4 to advance this circuit. After the time $T_6$, the detection pulse *b* is not produced until the next pulses of the synchronizing pattern appear in the received pulse train. In this manner, the position of the synchronizing pulse *c* produced at the receiving side is made coincident with that of the synchronizing pattern detection pulse. In other words, correct frame synchronization is thus established to provide correctly synchronized timing pulse trains at the output terminals 9.

In this circuit, the operation of inhibiting gate 3 is extremely important. To correctly maintain this operation, that time must be less than the one clock interval in which the successive operation in the loop is completed, such successive operation beginning from the application of the clock pulse to inhibit gate 3 and ending at the application of the delayed tentative synchronizing pulse *e* to inhibit gate 3. In the circuit shown in FIG. 1, it is assumed that the delay in each circuit is zero and that delay circuit 7 provides a delay of about three/fourths of a clock interval. In practice, however, delay is inevitable in each circuit and, hence, the frame synchronizing circuit must be designed with such delay in mind.

Figure 3:
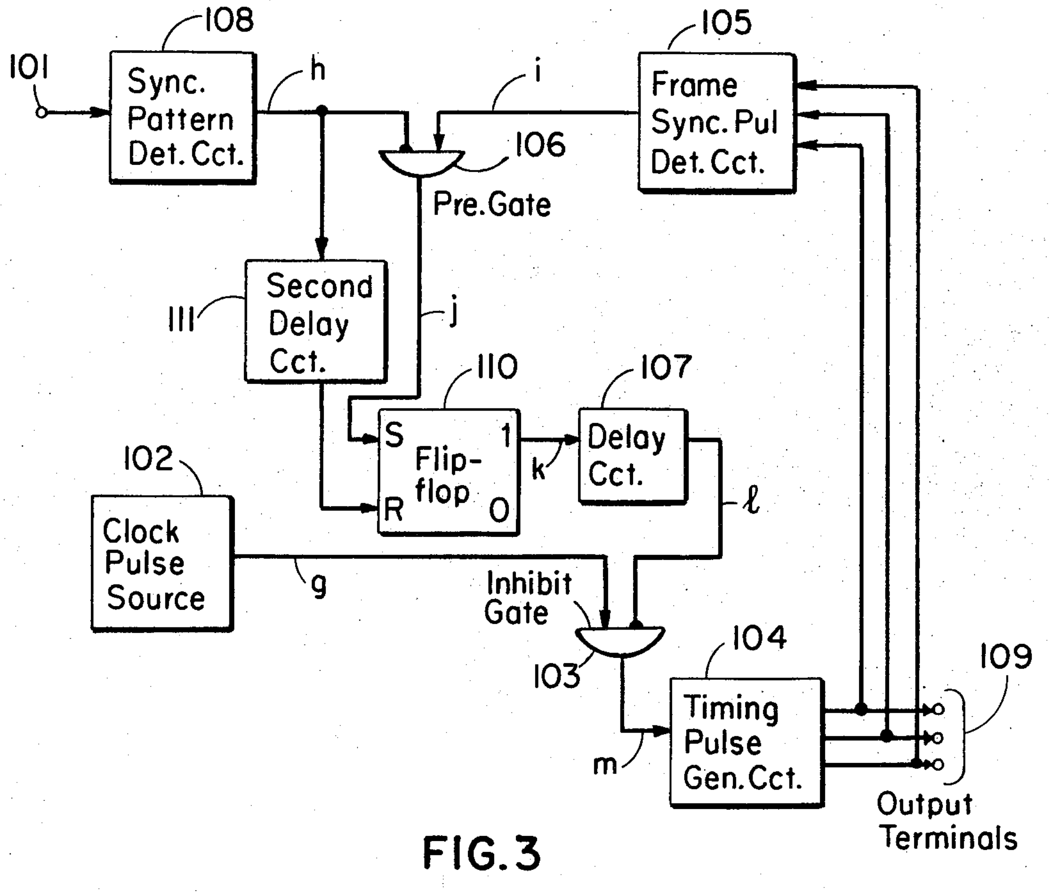
FIG. 3 is a schematic block diagram showing a frame synchronizing circuit according to one embodiment of this invention.

The embodiment of the invention shown in FIG. 3, operates similarly to the prior art circuit of FIG. 1 with respect to the application of the received pulse train to an input terminal 101, the production of the detection pulse *h* by a synchronizing pattern detection circuit 108, the application of the clock pulses generated by a clock pulse cource 102 to an inhibit gate 103 whose inhibit input 1 is supplied from a delay circuit 107, the application of the output pulses *m* to a timing pulse generating circuit 104 which supplied timing pulse trains to output terminals 109, the production of a tentative synchronizing pulse *i* by a synchronizing pulse generating circuit 105, and the application of the detection pulse *h* and the tentative synchronizing pulse *i* to a frame synchronizing circuit. Due to the inherent delay of operation, preliminary gate 106 produces a discoincidence pulse *j* at a first delay time $D_1$ after the production of the detection pulse *h* at the output of synchronization pattern detection circuit 108. This delay time $D_1$ is mainly due to the inherent delay of the gate 106 and to the delay caused by the wirings connected to the gate 106.

In accord with the invention, the frame synchronizing circuit further comprises a flip flop 110 set by the discoincidence pulse *j* to produce at a second delay time $D_2$ after the appearance thereof a set output *k* for delay circuit 107. This delay time $D_2$ is mainly due to the inherent delay of the flip flop 110 and to the delay caused by the wirings connected to the flip flop 110. The frame synchronizing circuit further comprises a second delay circuit 111, connected between the output terminal of synchronizing pattern detection circuit 108 and the reset terminal of flip flop 110, for resetting flip flop 110 at a third delay time $D_3$ after the production of the detection pulse *h* that is substantially equal to $D_1$ plus $D_2$.

Figure 4:
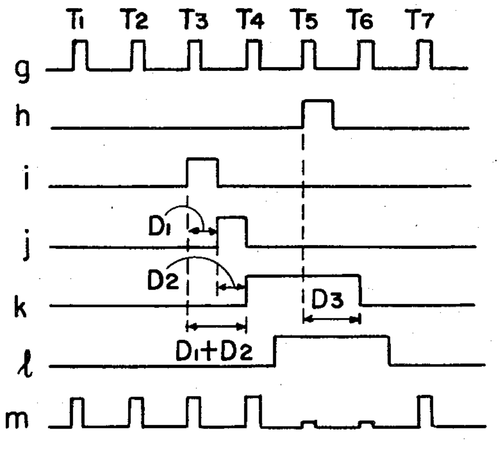
FIG. 4 is a waveform diagram illustrating the operation of the circuit shown in FIG. 3.

Referring further to FIGS. 3 and 4, it is assumed that the correct synchronizing position exists at the time $T_5$ and that the tentative synchronizing pulse *i* is generated at the time $T_3$. The tentative synchronizing pulse *i* sets flip flop 110 through preliminary gate 106 at a time $D_1$ plus $D_2$ after the production of the synchronizing pulse *i*. The detection pulse *h* produced at the time $T_5$ resets flip flop 110 at a time $D_3$ after the time $T_5$. The width of the set output *k* of flip flop 110 is equal to an integral multiple of the clock pulse interval that is equal to the time difference between the generation of the tentative synchronizing pulse *i* and the production of the detection pulse *h*. Thus, the number of the clock pulses *g* to be applied to timing pulse generating circuit 104 are inhibited such that generation of the next tentative synchronizing pulse *i* may be in synchronism with the production of the next detection pulse *h*. Delay circuit 107 is used to bring the leading and the trailing edges of the thus produced inhibit pulse *l* out of coincidence with the like edges of the clock pulses *g* and may therefore be dispensed with if the delay time $D_1$ plus delay time $D_2$ or $D_3$ is fairly different from the clock interval or an integral multiple thereof.

It will now be understood that the inherent delay of the loop is not related directly to the synchronizing operation. Furthermore, the amount of delay of the loop should merely be a value which recovers the synchronism by the time of the appearance of the next synchronizing pattern in the received pulse train and need not be less than a clock interval. Still further, it is possible to inhibit the required number of the clock pulses *g* at any time interval during one frame which generally has more than several hundred bits. There is signal delay in the wiring. Due to this delay and other delays, the phase relation shown in FIG. 4 may not necessarily apply. It is to be noted, however, that inasmuch as various pulses generated in the system are synchronized with the clock pulses, this invention is applicable regardless of the phase relation.

Thus while only a single embodiment of the present invention has been herein specifically described, it will be apparent that modifications may be made therein without departing from the spirit and the scope of the invention.

I claim:

1. In a frame synchronizing circuit for digital communication comprising means for generating a detection pulse each time at least one pulse of a predetermined frame synchronizing pattern appears in the received digital pulse train, means for producing a tentative frame synchronizing pulse in each frame period, means for producing a discoincidence pulse each time said synchronizing pulse is non-coincident with said detection pulse, and means for inhibiting a required number of said clock pulses, the improvement which comprises: said inhibiting means including means for producing an output pulse having a width sufficient to inhibit said required number of said clock pulses, the width of said output pulse being determined by the time difference between said discoincidence pulse and said detection pulse, means for supplying said discoincidence pulse to said output pulse producing means, and means for supplying said detection pulse to said output pulse producing means.

2. The improvement of claim 1, in which said output pulse producing means comprises a bistable circuit having a set terminal receiving said discoincidence pulse, and a reset terminal receiving said detection pulse.

3. The improvement of claim 2, in which detection pulse supplying means comprises delay means coupled between said detection pulse generating means and said reset terminal of said output pulse producing means.

4. The improvement of claim 3, in which said delay means provides a delay that is substantially equal to the time difference between said tentative frame synchronizing pulse and said output pulse.

5. The improvement of claim 1, in which said detection pulse supplying means comprises delay means coupled between said detection pulse generating means and said output pulse producing means.

6. The improvement of claim 5, in which said delay means provides a delay that is substantially equal to the time difference between said tentative frame synchronizing pulse and said output pulse.

* * * * *